(12) United States Patent
Ono

(10) Patent No.: US 7,281,555 B2
(45) Date of Patent: Oct. 16, 2007

(54) OFF-THE-ROAD TIRE

(75) Inventor: Akira Ono, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 145 days.

(21) Appl. No.: 10/479,725

(22) PCT Filed: Jun. 7, 2002

(86) PCT No.: PCT/JP02/05690

§ 371 (c)(1),
(2), (4) Date: Jun. 15, 2004

(87) PCT Pub. No.: WO02/100664

PCT Pub. Date: Dec. 19, 2002

(65) Prior Publication Data

US 2004/0211502 A1    Oct. 28, 2004

(30) Foreign Application Priority Data

Jun. 7, 2001   (JP) .............................. 2001-172382

(51) Int. Cl.
*B29C 35/02* (2006.01)
*B60C 11/11* (2006.01)
*B60C 11/13* (2006.01)

(52) U.S. Cl. ..................... 152/209.15; 152/209.13; 152/209.18; 152/209.22; 152/209.27; 152/902; 152/DIG. 3; 264/326

(58) Field of Classification Search ........... 152/209.12, 152/209.13, 209.15, 209.18, 209.22, 209.27, 152/902, DIG. 3; 264/326

See application file for complete search history.

(56) References Cited

U.S. PATENT DOCUMENTS

| | | | | |
|---|---|---|---|---|
| 2,109,691 A | * | 3/1938 | Ayguesvives | 152/209.18 |
| 3,553,789 A | | 1/1971 | Allitt | |
| 4,412,575 A | * | 11/1983 | Maeda et al. | 152/209.22 |
| 5,420,193 A | | 5/1995 | Matsue et al. | |
| 6,415,834 B1 | * | 7/2002 | Carra et al. | 152/209.27 |
| 6,957,676 B2 | * | 10/2005 | Bettiol et al. | 152/209.27 |
| 2002/0170644 A1 | * | 11/2002 | Comps | 152/209.5 |

FOREIGN PATENT DOCUMENTS

| | | | |
|---|---|---|---|
| DE | 18 05 178 A | | 5/1970 |
| EP | 379854 | * | 8/1990 |
| JP | 63-312204 | * | 12/1988 |
| JP | 3-86603 | * | 4/1991 |
| JP | 6-199103 | * | 7/1994 |
| JP | 7-81323 | * | 3/1995 |
| JP | 07-329513 | * | 12/1995 |
| WO | WO 01/24987 A1 | | 4/2001 |
| WO | WO 01/32448 | * | 5/2001 |

* cited by examiner

*Primary Examiner*—Steven D. Maki
(74) *Attorney, Agent, or Firm*—Sughrue Mion Pllc.

(57) ABSTRACT

The invention is to improve wear resistance and resistance to crack growth of an off-the-road tire having a gauge of a tread rubber of 60-200 mm, in which a plurality of widthwise grooves extending substantially in a widthwise direction of the tire are arranged in each side region of the tread, and a pair of circumferential fine grooves continuously extending straight-forward or zigzag in a circumferential direction of the tire are arranged in a central zone of the tread, and a plurality of widthwise fine grooves extending substantially in the widthwise direction of the tire and contacting their grooves walls with each other in a ground contact area are arranged between these circumferential fine grooves.

16 Claims, 8 Drawing Sheets

OFF-THE-ROAD TIRE

TECHNICAL FIELD

This invention relates to an off-the-road tire capable of simultaneously establishing the wear resistance and resistance to crack growth of a tread at a higher level even under severer load condition and traction condition.

BACKGROUND ART

Since the off-the-road tires used for construction vehicle and the like are required to have considerably high load capacity and traction performance as compared with tires for truck and bus, it is general to have a tread pattern that ribs capable of developing a high wear resistance under a high load are formed on a central portion of the tread and lugs capable of developing a high traction performance are formed on both side portions of the tread.

However, when a width of a zone forming straight or zigzag ribs in the central portion of the tread sandwiching between phantom lines each connecting tops of lug grooves to each other is made wider than necessary, traction performance during the running on an uphill grade or the like is lacking, and also there is a drawback that lateral slippage is apt to be easily caused in the steering because circumferential groove(s) is not naturally existent in the central portion. For this end, so-called lug-block mix pattern in which block rows producing an edge effect in a widthwise direction of the tread are formed in the central portion of the tread are used at the present time.

On the other hand, the tire is recently and strongly demanded to have further improvements of the load capacity and traction performance and an improvement of wear resistance with the further advance of vehicle performances. In order to satisfy such a demand, there is a tendency that the tire size is made large and the thickness of the tread is made thicker. In this case, it is particularly feared that heat generation in the central portion of the tread exerts upon the durability of the tire.

For the purpose of obtaining a tread pattern capable of being durable to excessive traction and realizing an excellent resistance to lateral slipping and enhancing heat radiation while leaving continuous rib rows are left in the central portion of the tread as far as possible considering the wear resistance, therefore, it is attempted to arrange a pair of circumferential fine grooves for heat radiation in the central portion of the tread at a required minimum groove width.

In the off-the-road tire provided with the circumferential fine grooves for heat radiation, however, when the block rows are formed in the central portion of the tread as mentioned above, each block easily moves in front and behind or in left and right during the running of the tire under loading, so that the demand for high load capacity and high traction performance can not be satisfied and there are caused problems relating to the wear resistance such as premature wearing of tread, block chipping and other troubles.

On the other hand, when rows of land portion continuing more than necessary in the circumferential direction are formed on the central portion of the tread in such an off-the-road tire, if cut failure produced on the surface of the land portion row arrives at the belt layer, a large stress is produced resulting from the fact that the thick land portion rows are continuously arranged in the circumferential direction whenever the tread is largely deformed in the circumferential direction by subsequently large traction force, whereby there is caused a problem relating to the resistance to crack growth that the cut failure progresses as a crack between the tread and the belt in the circumferential direction of the tire along a propagation direction of such stress and further so-called cut separation of completely separating the tread from the belt is easily developed.

The invention is to solve the above problems inherent to the conventional technique and to provide an off-the-road tire capable of providing a high wear resistance without causing troubles such as premature wearing of the tread, block chipping and the like even under the exposure to severer load condition and traction condition, and capable of providing an excellent resistance to crack growth that even if cur failure is produced on a ground contact face of the tread, it hardly progresses into a crack between the tread and the belt layer.

DISCLOSURE OF THE INVENTION

The off-the-road tire according to the invention is characterized in that a gauge of a tread rubber is within a range of 60-200 mm, and a plurality of widthwise grooves extending substantially in a widthwise direction of the tire are arranged in each side region of the tread, and a pair of circumferential fine grooves continuously extending straightforward or zigzag in a circumferential direction of the tire are arranged in a central zone of the tread, and a plurality of widthwise fine grooves extending substantially in the widthwise direction of the tire and contacting their grooves walls with each other in a ground contact area are arranged between these circumferential fine grooves.

Moreover, the central zone of the tread is a zone corresponding to not more than 50% of a tread width centering on an equatorial line of the tire.

In this off-the-road tire, a high heat radiation of the tread in addition to the resistance to lateral slipping can be obtained by the circumferential fine grooves. On the other hand, the widthwise fine grooves in the central zone of the tread are closed at a state of contacting their groove walls with each other during the running of the tire under loading and act as such a land portion that the adjoining blocks in the circumferential direction of the tire are substantially continued in the circumferential direction, so that the blocks in the block row located in the central zone of the tread hardly deform in front and behind or in left and right even in the running of the tire under loading. As a result, the occurrence of troubles such as premature wearing of the tread, block chipping and the like can be effectively prevented to develop an excellent wear resistance even under extremely high load condition and excessive traction condition.

In such an off-the-road tire, the plural widthwise fine grooves are arranged in the central zone of the tread to prevent the land portion row in the central zone of the tread from the continuing more than necessary. Therefore, even if cut failure generated in the land portion row, i.e. the blocks of the block row arrives at the belt layer, the continuity of the land portion is prevented by the widthwise fine grooves to reduce stress of strain deformation in the fine groove portion as compared with that in other portions with respect to a large strain deformation of the tread in the circumferential direction of the tire, and hence the growth of the cut failure as a crack between the tread and the belt layer in the circumferential direction of the tire can be prevented by the widthwise fine grooves, so that an excellent resistance to crack growth can also be developed effectively.

According to the off-the-road tire, therefore, the excellent wear resistance can be realized based on the selected width of the widthwise fine groove without bringing about the troubles such as premature wearing of the tread, block chipping and the like even if the action of extremely high load and excessive traction is applied to the tire, while the excellent resistance to crack growth which hardly progresses the cut failure produced in the land portion row of the central zone into the crack between the tread and the belt layer can be realized based on the presence of the widthwise fine grooves itself.

Preferably, the off-the-road tire is produced by vulcanizing a region from a bead portion of a product tire to a sidewall portion and a tread shoulder portion thereof through a mold part of a full mold form and a region corresponding to a central portion of the tread located from the tread shoulder portion toward a tread center through a mold part of a split mold form, respectively.

As the off-the-road tire, there are frequently super-large size tires of a lug-block mix pattern structure having a thicker tread and relatively deep circumferential fine grooves in its central portion. In case of vulcanization building such an off-the-road tire, it is possible to conduct vulcanization through only so-called split mold. In this case, since the tire size is vary large, each segment constituting the split mold becomes considerably expensive and the manufacture thereof is required to take a greater number of steps and also it is difficult to rapidly cope with the change of tire size, alteration of pattern and the like requiring the change of each segment.

On the other hand, when the off-the-road tire is built by vulcanization through only so-called full mold, the exchange, alteration of the pair of the mold parts and the like can be conducted relatively easily, but there is a fear that when the tire is removed off from the mold, the tread is damaged in the width-narrow circumferential fine groove portions having a significant groove depth or the like.

In the invention, therefore, the vulcanization is carried out by using the mold part of full mold form comprised of two upper and lower mold segments conducting the mold opening substantially in an axial direction of the tire with respect to the region from the bead portion of the product tire to the sidewall portion and tread shoulder portion thereof, and by using the mold part of spilt mold form comprised of plural divided segments in the circumferential direction of the tire conducting the mold opening substantially in the radial direction of the tire with respect to the region corresponding to the central portion of the tread located from the tread shoulder portion toward the tread center, whereby the number of mold manufacturing steps, the mold cost and the like can be reduced but also the change of tire size, alteration of pattern and the like can be conducted quickly and further the fear of damaging the circumferential groove portions can be sufficiently removed.

In the alteration of the tread pattern of the tire to be vulcanized, it is possible to alter only the mold part of the split mold form while the mold part of the full mold form having a high versatility is used as it is, or in other words, the widthwise grooves formed in the tread shoulder zone are common. Thus, a time of exchanging the mold as a time for waiting the vulcanization can be advantageously shortened and also the total cost of the mold can be reduced.

In the invention, a boundary between the mold part of the full mold form and the mold part of the split mold form is made in correspondence with a groove edge of a straight or zigzag circumferential fine groove to be formed in the tread and located toward a side edge of the tread, and the vulcanization is conducted in a mold of these mold parts located along the groove edge to produce an off-the-road tire. In the mold opening of these mold parts after the vulcanization, a fear of damaging the tread in the vicinity of the groove portion is removed, and also spew rubber overflowed between these mold parts, which damages the uniformity of ground contact pressure of the land portion to easily generate a nucleus of uneven wear and easily rendered into a nucleus for tread crack as it is, can be positioned on the groove edge, whereby an influence of the spew rubber upon the occurrence of uneven wear and crack can effectively be controlled.

When the circumferential fine groove is zigzag, the groove volume per unit circumferential length of the tire can be made larger than that of the straight groove to further enhance heat radiation effect through the circumferential fine groove.

Further, when the off-the-road tire is produced by vulcanizing through a mold in which the boundary between the mold parts as mentioned above is straightforward positioned in correspondence with a groove edge of a zigzag circumferential fine groove to be formed in the tread and located nearest to a side edge of the tread, the damage of the tread in the mold opening after the vulcanization can be prevented but also the spew rubber between these mold parts can be positioned in the land portion of the tread side zone producing a relatively low ground contact pressure, whereby the spew rubber resulting in the occurrence of uneven wear and forming the nucleus for crack can be advantageously blocked.

Moreover, when the tire is produced by vulcanizing through a mold in which the boundary between the mold parts is positioned in correspondence with the land portion defined by the circumferential fine groove to be formed in the tread toward the side edge of the tread, the spew rubber between these mold parts is positioned in place having a lower ground contact pressure, whereby the fear of resulting in the uneven wear and the like can be sufficiently removed.

On the other hand, the width of the mold part of the split mold form becomes relatively wider, so that the degree of freedom in the alteration of the tread pattern can be enhanced.

In such an off-the-road tire, when a groove width of the widthwise groove is 25-80 mm, the traction performance based on the action of the tread side zone and the wear resistance of such a side zone can be well established, while when a groove depth of the widthwise groove is 50-160 mm, the wear resistance of the tread side zone and the resistance to heat generation can be well established.

The term "groove width" used herein means an average value of widths measured in an existing direction of a groove center line over 50% of a central region of the center line, while the term "groove depth" means an average value of depths measured in an existing direction of a groove center line over 50% of a central region of the center line.

When the groove width of the circumferential fine groove is 15-50% of the groove width of the widthwise groove, the necessary and sufficient heat radiation effect is ensured but also the rigidity of the circumferential fine groove forming portion, which corresponds to approximately a half of a tread half-width and is apt to be relatively worn, can be enhanced by contacting groove walls with each other in the ground contact face, so that the rigidity of the land portion as a whole of the tread can be increased to improve the wear resistance.

Also, when the groove depth of the circumferential fine groove is 60-100% of the groove depth of the widthwise groove, the contacting of the groove walls in the ground contact face can easily be realized.

Preferably, the groove width of the widthwise fine groove is 15-50% of the groove width of the widthwise groove. In this case, the growth of cracks between the tread and the belt resulted from the cut failure is effectively prevented by the widthwise fine grooves, while an excellent wear resistance can be given to the land portion of the central zone of the tread by contacting groove walls with each other.

In other words, when the groove width is less than 15%, the circumferential length of a thin portion beneath the groove as a region of preventing the crack growth is too short and there is a fear that the widthwise fine groove can not sufficiently develop an expected function, and also a width of a projection in a mold for the formation of the groove, i.e. a thickness thereof is too thin and the lowering of the durability of the projection can not be avoided. While, when it exceeds 50%, it is difficult to contact the groove walls in the ground contact face with each other or contact the adjoining land portions in the circumferential direction with each other and there is left a fear of chipping the land portions or the like.

Preferably, the groove depth of the widthwise fine groove is 60-100% of the groove depth of the widthwise groove. In this case, excellent resistance to crack growth and protecting property to tire casings such as belt, carcass and the like can be simultaneously realized.

When the groove depth is less than 60%, the rubber gauge of the tread beneath the widthwise fine groove is too thick, and stress in the central zone of the tread during the running of the tire, which results in the growth of the cut failure arrived at the belt layer in the circumferential direction of the tire, can not be sufficiently reduced, so that it is difficult to realize the excellent resistance to crack growth. While, when it exceeds 100%, the rubber gauge beneath the widthwise fine groove is too thin and the tire casings such as belt, carcass and the like can not sufficiently be protected.

In such an off-the-road tire, an average intersecting angle of the widthwise fine groove at an acute angle side with respect to the equatorial line of the tire is preferably 45-90°.

The term "average intersecting angle" used herein means an angle of a line segment connecting intersects between the circumferential fine groove and the widthwise fine groove to each other with respect to the equatorial line of the tire.

In this case, the excellent wear resistance can be realized. That is, when the intersecting angle is less than 45°, it is difficult to contact the groove walls of the widthwise fine groove with each other during the running of the tire under loading and also it is difficult to cooperate the adjoining land portions in the circumferential direction as a land portion body continuing substantially in the circumferential direction and hence it is difficult to realize the excellent wear resistance. Further, an acute corner part is created in the land portion defined by the widthwise fine grooves to easily chip such a corner part during the running of the tire under loading and hence it is difficult to realize the excellent wear resistance.

Preferably, a JIS A hardness of tread rubber in the central zone of the tread is 55-80, while a loss tangent tan δ (25° C.) thereof is 0.05-0.35.

The term "JIS A hardness" used herein means a hardness measured at a testing temperature of 25° C. using a type A testing machine for a durometer hardness test according to JIS K6253-1993, while the term "loss tangent tan δ (25° C.)" means a value that a loss tangent tan δ represented by a ratio of loss modulus to dynamic modulus is measured at a testing temperature of 25° C. under conditions of initial static load of 1.6 N, average strain amplitude of 1% and testing frequency of 52 Hz using a spectrometer made by Toyo Seiki Co., Ltd. according to "case through load wave, deflection wave (tension)" of JIS K6394-1995.

In this off-the-road tire, a high rigidity of the land portion is ensured and the excellent resistance to crack growth can be provided by rendering the hardness of the tread rubber at the central zone of the tread into 55-80, while the excellent heat resistance can be developed while ensuring the necessary rigidity of the land portion by rendering the loss tangent tan δ (25° C.) into 0.05-0.35.

Preferably, the groove width of the circumferential fine groove is a width contacting the groove walls with each other in the ground contact face. In this case, the rigidity of portions forming the circumferential fine grooves and hence the rigidity of the land portions in the whole of the tread can be enhanced by contacting the groove walls of the circumferential fine groove during the running of the tire under loading as previously mentioned to develop the excellent wear resistance.

Also, it is preferable that the block defined by the circumferential fine grooves and the widthwise fine grooves as a land portion is triangular, quadrilateral or hexagonal. In this case, the blocks can be continuously arranged in the circumferential direction to attain a uniform block row in the circumferential direction while ensuring the block rigidity required in the central zone of the tread. In other words, a portion having a low rigidity may be produced if the shape of the block is complicated.

The off-the-road tire having the above construction is preferable to be produced by vulcanizing and building in a mold wherein the width of the projection for the formation of the circumferential fine groove is made smaller than the width of the projection for the formation of the widthwise fine groove.

In such an off-the-road tire, it is general to adopt such a belt structure that the laminating number of belt layers is large in the central zone of the tread and small in the side zone thereof for well establishing the control of size growth in the central zone of the tread and the prevention on the occurrence of troubles at the side edge of the belt and the neighborhood thereof. According to this belt structure, a side edge of a narrow-width belt layer contributing to the reinforcement of the central zone of the tread is frequently existent in a position corresponding to approximately 25% of a tread width measured from the equatorial plane of the tire or the neighborhood thereof.

For this end, the size growth in the vicinity of the side edge of the narrow-width belt layer particularly tends to be larger than that of the adjoining portion thereof in the inflation of an air pressure into the tire and during the running of the tire under loading.

Therefore, the groove width of the circumferential fine groove usually extending in the vicinity of the side edge of the narrow-width belt layer and tending to widen the groove width accompanied with the size growth is made approximately equal to the groove width of the widthwise fine groove extending in the central zone of the tread having a small size growth in the use of the tire and tending to narrow the groove width through the pushing of the surrounding tread rubber, which is attained by selecting the respective widths of the projections for the formation of the respective fine grooves, so that it is preferable that as to the relative widths of the respective fine grooves at a time of vulcanizing and building the tire, the circumferential fine groove is made narrower than the widthwise fine groove considering the influence of the size growth as mentioned above.

More preferably, the groove bottom of straightforward extending portions in the zigzag extending circumferential fine groove is rendered into a raised bottom at an end portion located toward a side edge of the tread. According to this structure, the increase of the groove width resulted from the size growth of the tire can be effectively controlled based on the increase of the groove bottom rigidity through the raised bottom portion, and also the occurrence of cracks at the groove bottom resulted from the large enlargement of the groove width can be prevented.

On the other hand, when the groove bottom of the straightforward extending portions in the zigzag extending circumferential fine groove is rendered into a raised bottom at an end portion located toward the side of the tread center, the protrusion of the surface of the land portion at the side edge of the tread outward from the surface of the land portion at the side of the tread center in the radial direction due to the difference of expansion amount in the radial direction between the land portion located at the side of the tread center and the land portion located at the side of the side edge of the tread, which are defined by the circumferential fine grooves and resulted from the difference in the influence of the size growth thereupon, can be controlled based on the rigidity of the raised bottom portion connecting both the land portions and hence deformation restraining force.

When a surface height of a corner part in the land portion adjacent to the side edge of the tread defined by the zigzag extending circumferential fine grooves is gradually decreased toward a top side thereof, even if the surface of the land portion located toward the side edge of the tread is relatively protruded outward from the surface of the land portion located at the side of the tread center in the radial direction under an influence of the size growth, the formation of the corner part as a nucleus for uneven wear can be advantageously prevented by decreasing the surface height of the corner part toward the top side thereof.

BEST MODE FOR CARRYING OUT THE INVENTION

Figure 1:
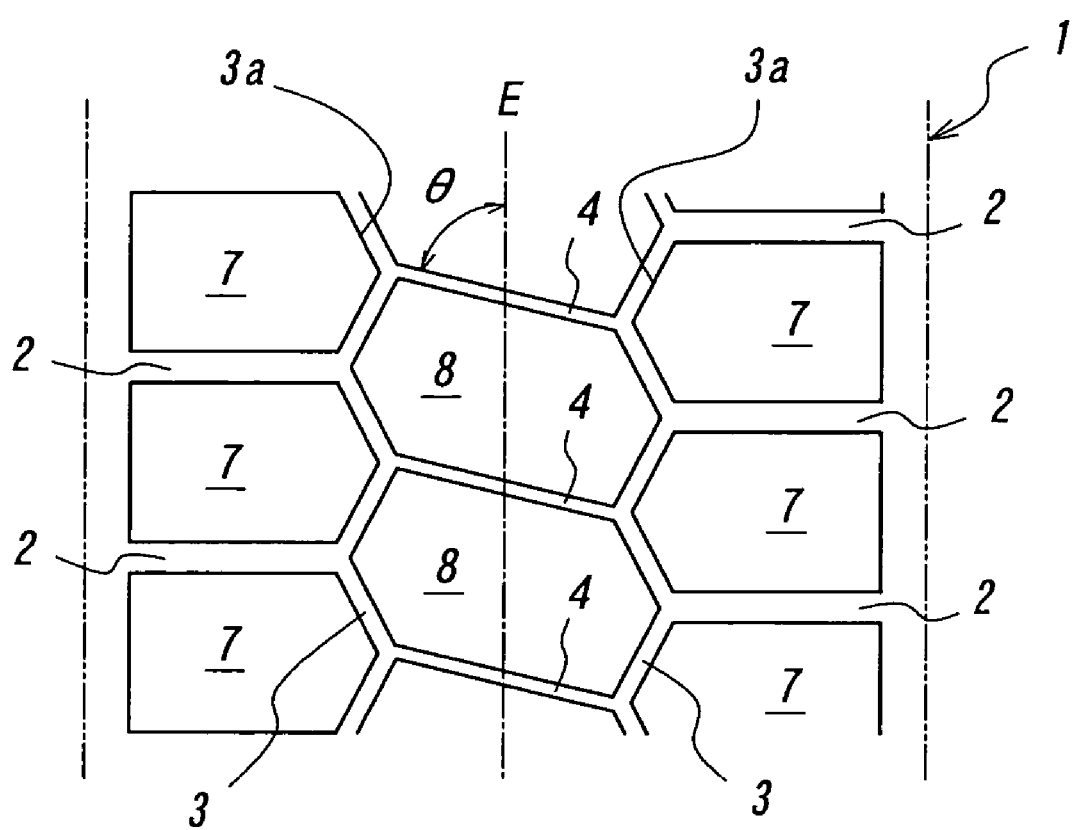
FIG. 1 is a developed view of a tread pattern showing an embodiment of the invention.

In FIG. 1 is shown a developed view of a tread pattern, in which numeral 1 is a tread.

In this embodiment, the tread 1 has a rubber gauge of 60-200 mm, and a plurality of widthwise grooves 2 extending substantially in a widthwise direction of the tire are arranged in each side zone of the tread 1 and a pair of circumferential fine grooves 3 continuously extending in a circumferential direction of the tire are arranged in a central zone of the tread 1, and a plurality of widthwise fine grooves 4 extending substantially in the widthwise direction of the tire and opening to both circumferential fine grooves 3 are arranged between both the circumferential fine grooves. In this case, the groove width of the widthwise fine groove 4 is a width contacting groove walls with each other in a ground contact face.

In the illustrating embodiment, the pair of the circumferential fine grooves 3 are extended zigzag in the circumferential direction, but it is possible to extend them in a straight form.

Figure 2:
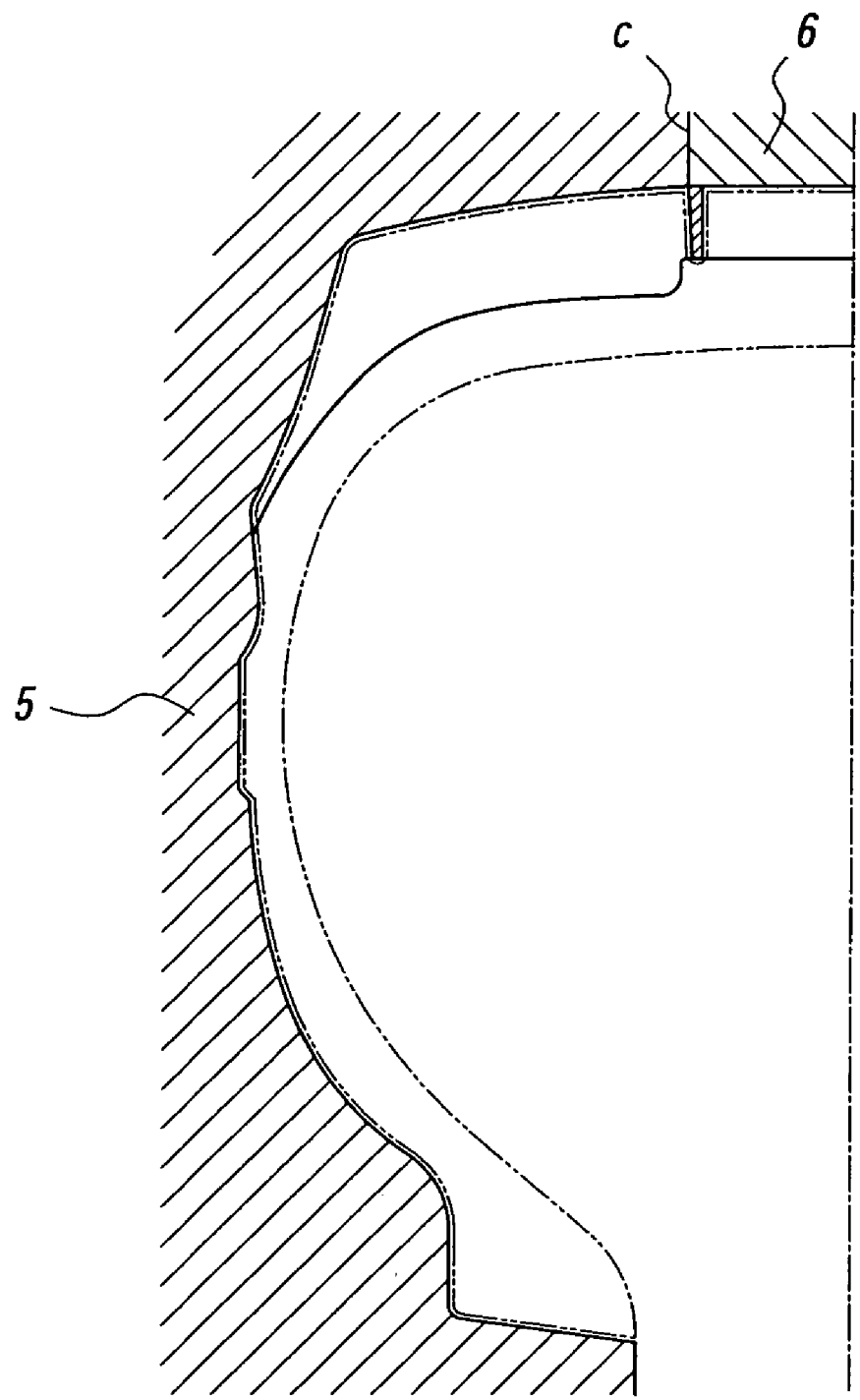
FIG. 2 is a diagrammatically section view of a main part in a radial direction illustrating a boundary position of a mold part.

The tire having such a tread pattern can be produced by vulcanizing a region corresponding to a bead portion and a sidewall portion and a side portion of a tread of a product tire with a mold part 5 of a so-called full mold form and a region corresponding to a central portion of the tread located from the side portion of the tread toward a tread center with a mold part 6 of a so-called split mold form as shown, for example, by a radially section in FIG. 2. In this case, it is preferable that a boundary C between the mold part 5 of the full mold form and the mold part 6 of the split mold form is positioned in correspondence with a groove edge 3a of the straight or zigzag circumferential fine groove 3 formed in the tread 1 and located toward a side edge of the tread and along the groove edge 3a.

Moreover, the boundary C between both the mold parts 5 and 6 may be straightforward positioned in correspondence with a groove edge of the zigzag circumferential fine groove 3 formed in the tread 1 and located nearest to the side edge of the tread, or positioned in correspondence with a land portion defined from the circumferential fine groove 3 formed in the tread 1 toward the side edge of the tread such as a lug 7.

Figure 3A:
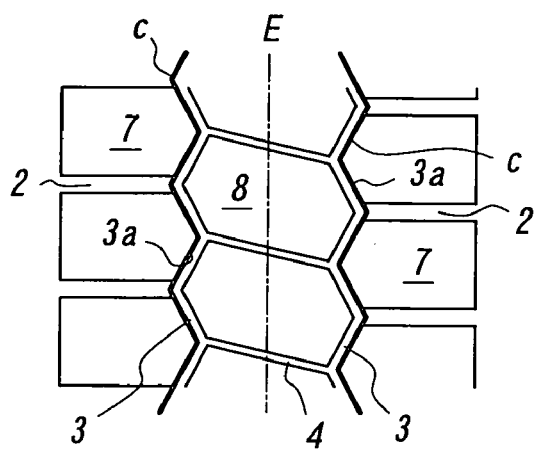
FIG. 3 is a schematic view illustrating a boundary position of a mold part in connection with a tread pattern.
Figure 3B:
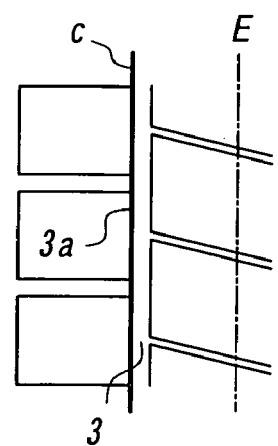

FIG. 3 is a schematic view illustrating the position of the above boundary between the mold parts in connection with a tread pattern, wherein FIG. 3a shows a case that the boundary C is positioned in correspondence with the groove edge 3a of the zigzag circumferential fine groove 3 located side the side edge of the tread along therewith, and FIG. 3b shows a case that the boundary C is positioned in correspondence with the groove edge 3a of the straight circumferential fine groove 3 located side the side edge of the tread along therewith.

Figure 3C:
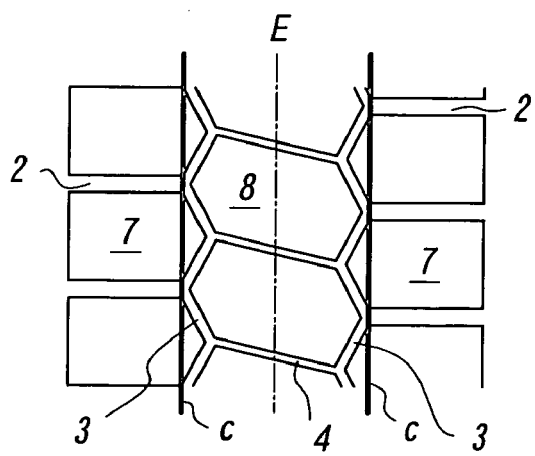
Figure 3D:
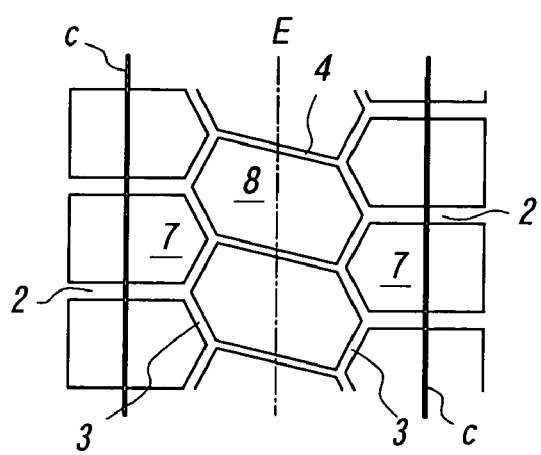

FIG. 3c shows a case that the boundary C is straightforward positioned in correspondence with the groove edge 3a of the zigzag circumferential fine groove 3 located nearest to the side edge of the tread along therewith, and FIG. 3d shows a case that the boundary C is positioned in the lugs 7 defined from the circumferential fine groove 3 toward the side edge of the tread.

In the thus produced tire, it is preferable that the groove width of the widthwise groove 2 is 25-80 mm and the groove depth thereof is 50-160 mm. Also, it is preferable that the groove width of the circumferential fine groove 3 is 15-50% of the groove width of the widthwise groove 2 and the groove depth thereof is 60-100% of the groove depth of the widthwise groove 2.

Such numerical ranges for the circumferential fine groove 3 are also applied to the widthwise fine groove 4. That is, it is preferable that the groove width of the widthwise fine groove 4 is 15-50% of the groove width of the widthwise groove 2 and the groove depth thereof is 60-100% of the groove depth of the widthwise groove 2.

Also, it is preferable that an average intersecting angle θ of the widthwise fine groove 4 at its acute angle side with respect to an equatorial line E of the tire is 45-90°.

And also, it is preferable that JIS A hardness of a tread rubber in the central zone of the tread is 55-80 and a loss tangent tan δ (25° C.) is 0.05-0.35.

Furthermore, it is preferable that the groove width of the circumferential fine groove 3 is rendered into a width of contacting groove walls with each other in a ground contact face, and that blocks 8 in the central zone of the tread defined by the circumferential fine grooves 3 and the widthwise fine grooves 4 are triangular, quadrilateral or hexagonal as illustrated.

According to the above off-the-road tire, the excellent wear resistance can be developed without causing troubles such as premature wearing, block chipping and the like even at a state of applying an extremely high load and an excessive traction but also the excellent resistance to crack growth hardly growing from cut failure produced on the surface of the block to crack between the tread and the belt layer, and further fears such as thermal fatigue and the like due to heat generation of the tread 1 can be sufficiently eliminated by heat radiation of the circumferential fine grooves 3.

Figure 4:
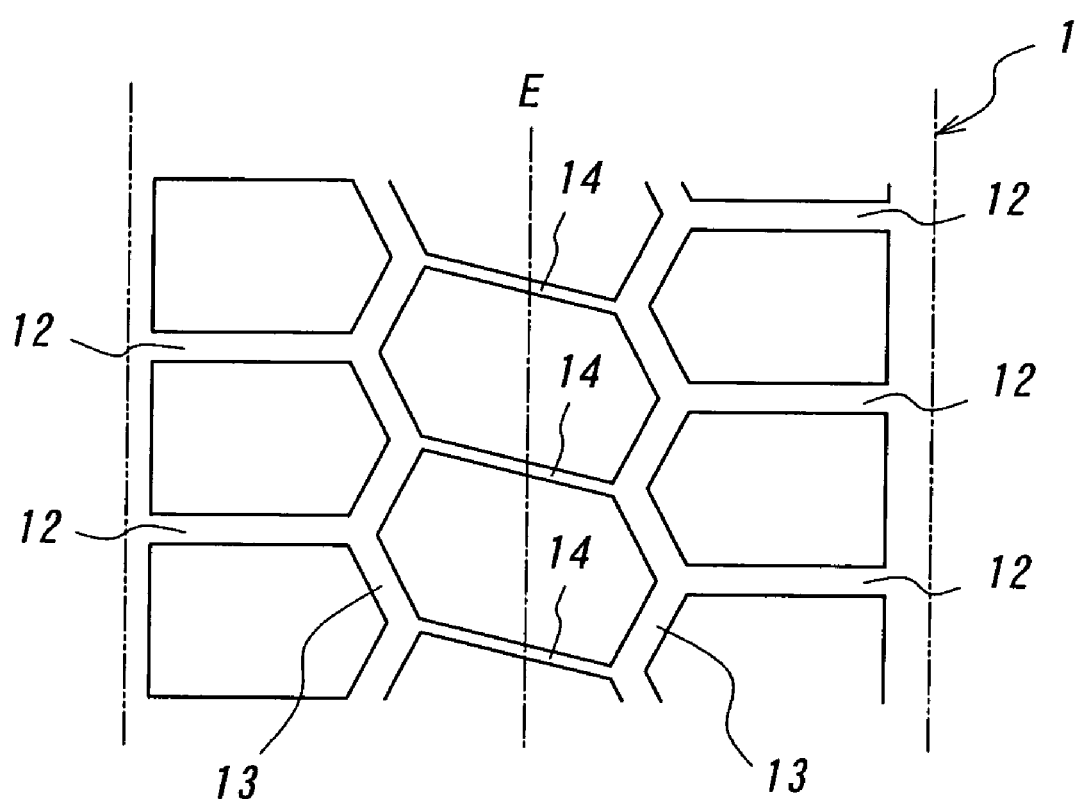
FIG. 4 is a developed view of a tread pattern showing another embodiment of the invention.

FIG. 4 is a developed view of a tread pattern showing another embodiment, in which numeral 12 is a widthwise groove, numeral 13 a circumferential fine groove and numeral 14 a widthwise fine groove.

This is the same construction as in FIG. 1 except that the groove width of the circumferential fine groove 13 is made wider to a level that the groove walls are not contacted in the ground contact face and the groove depth thereof is made shallower than that of FIG. 1 and the groove depth of the widthwise fine groove 14 is made shallower than that of FIG. 1.

Even in this tire, the excellent wear resistance can be developed even at a state of applying an extremely high load and an excessive traction likewise the above case, and also excellent resistance to crack growth and heat radiation function of the tread can be developed.

In the off-the-road tire as shown in FIG. 1, when the groove width of the circumferential fine groove 3 is made approximately equal to, for example, that of the widthwise fine groove 4 at a state of using the tire filled with an air pressure, it is preferable that a width size of a projection for the formation of the circumferential fine groove in a vulcanization mold is made smaller than a width size of a projection for the formation of the widthwise fine groove considering the amount of tire size growth as previously mentioned. Thus, the groove widths of the circumferential fine groove and the widthwise fine groove can be easily made approximately equal based on the fact that the amount of size growth accompanied with the filling of the cir pressure into a product tire is larger in a portion forming the circumferential fine groove than in a portion forming the widthwise fine groove.

Figure 5A:
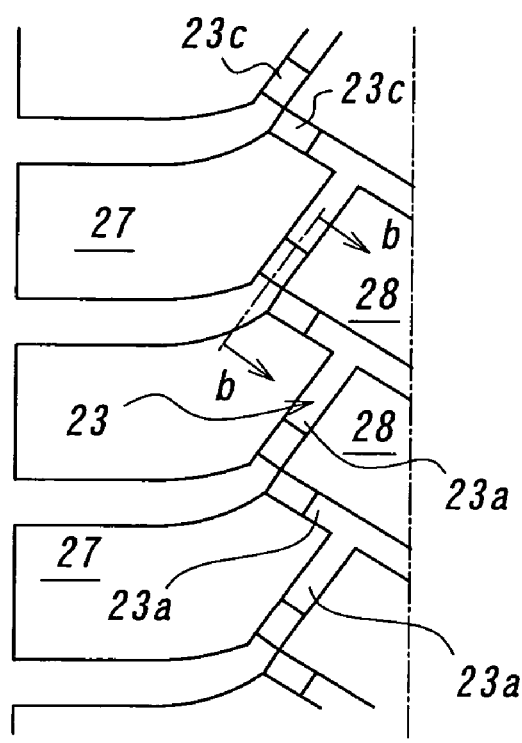
FIG. 5 is a diagrammatic view illustrating the other embodiment.
Figure 5B:
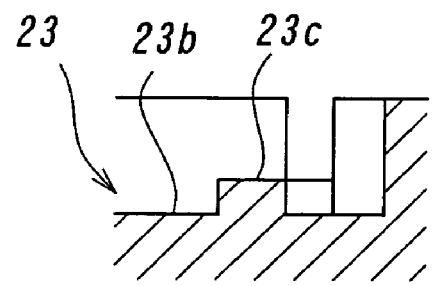

In order to suppress the enlargement of the groove width of the circumferential fine groove due to the above size growth of the off-the-road tire, as shown in FIG. 5, it is preferable that a raised bottom portion 23c as shown at a section in FIG. 5b is arranged on an end part of a groove bottom 23b of a straightforward extending portion 23a in a zigzag extending circumferential fine groove 23 located side the side edge of the tread and the rigidity of the groove bottom is enhanced by such a raised bottom portion 23c.

Figure 6A:
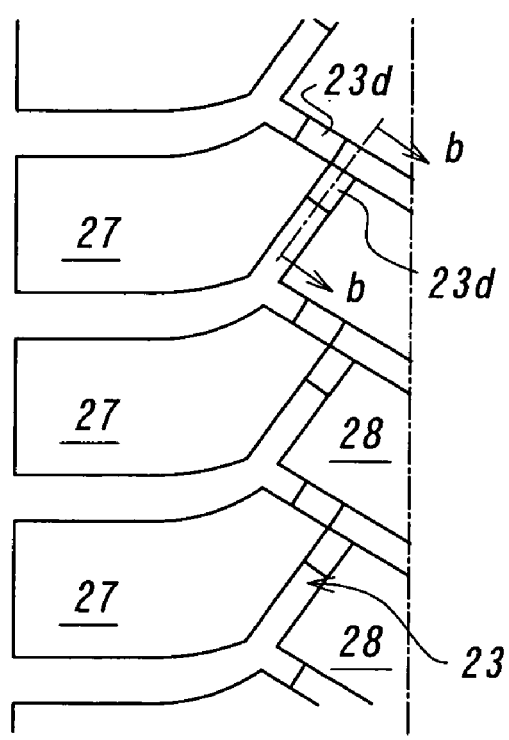
FIG. 6 is a diagrammatic view illustrating a further embodiment.
Figure 6B:
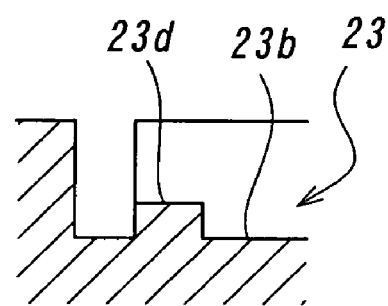

In case of considering that the size growth of the off-the-road tire becomes particularly large in the vicinity of the side edge of the narrow-width belt layer reinforcing the central zone of the tread or frequently in a portion of the circumferential fine groove adjacent to the side edge of the tread, as shown in FIG. 6, it is preferable that a raised bottom portion 23d as shown at a section in FIG. 6b is arranged on an end part of a groove bottom 23b of a straightforward extending portion 23a in a zigzag extending circumferential fine groove 23 located toward the t read center, whereby the protrusion of the surface of the lug 27 outward from the surface of the block 28 in the radial direction is suppressed by the rigidity of the raised bottom portion 23d connecting both to each other. Thus, the protruding amount of the lug surface to the block surface can be suppressed to a small level.

Figure 7A:
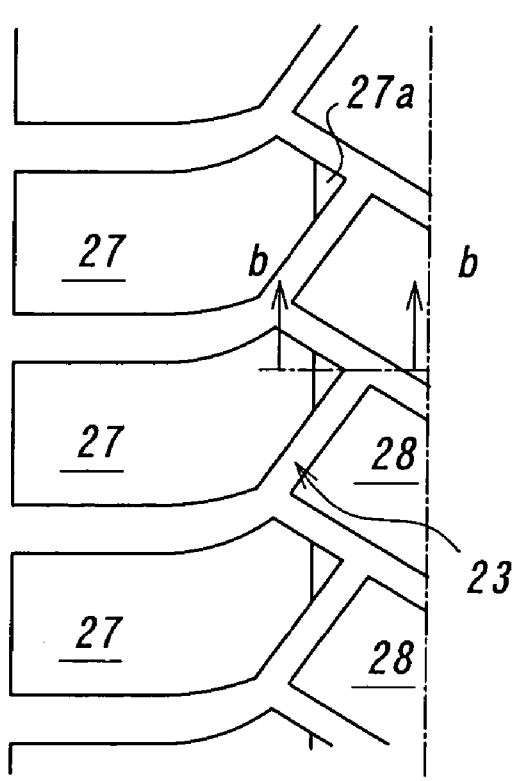
FIG. 7 is a diagrammatic view illustrating a still further embodiment.
Figure 7B:
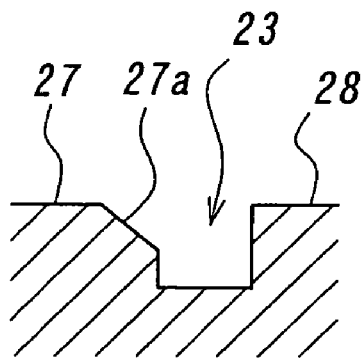

In stead of the above or in addition thereto, as shown in FIG. 7, when a slant face 27a gradually decreasing a surface height thereof toward a top side is arranged on a corner part defined by the circumferential fine groove 23 and adjoining to the side edge of the tread or a corner part of the lug 27 in the illustrated embodiment, the protrusion of the surface of the corner part outward from the block surface is effectively prevented by the action of the slant face 27a and also the rigidity of the corner part itself can be enhanced and hence the formation of the corner part as a nucleus for uneven wear and the premature progress of the uneven wear can be prevented advantageously.

EXAMPLE 1

There are prepared off-the-road tires according to the invention and performance evaluations with respect to wear resistance, resistance to crack growth, heat radiation and traction performances are carried out as mentioned below.

Figure 8:
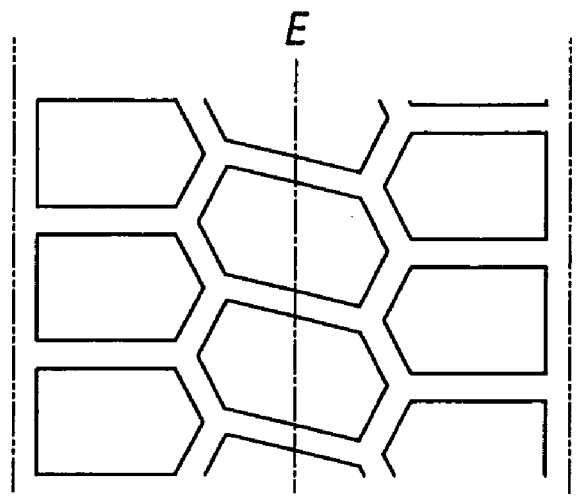
FIG. 8 is a developed view of a tread pattern in the conventional tire.
Figure 9:
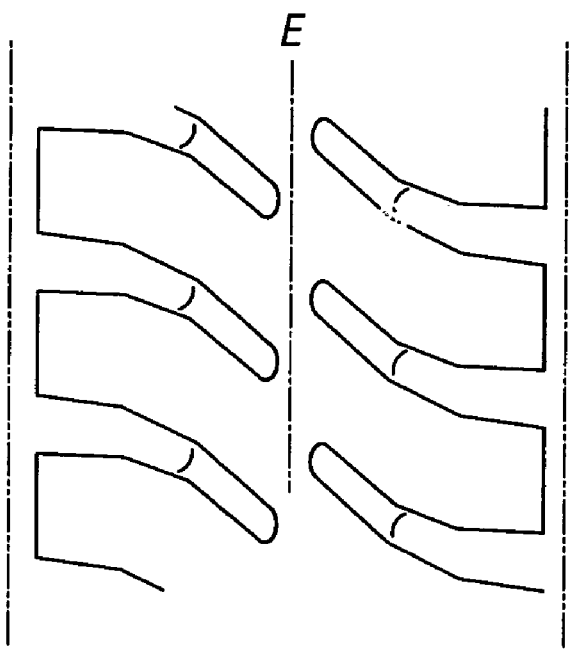
FIG. 9 is a developed view of a tread pattern in another conventional tire.

Example tire 1 has a tread pattern of FIG. 1, and Example tire 2 has a tread pattern of FIG. 4, and Conventional tire 1 has a tread pattern of FIG. 8, and Conventional tire 2 has a tread pattern of FIG. 9, respectively. Also, Example tire 3 has a groove structure of FIG. 5, and Example tire 4 has a groove structure of FIGS. 5 and 6, and Example tire 5 has a groove structure of FIGS. 5, 6 and 7.

Further, each of these test tires has dimensions as shown in Table 1, in which a region ranging from a bead portion to a sidewall portion has a structure similar to that of an off-the-road tire for a general construction vehicle.

Moreover, each test tire has a tire size of 4000R57, and a rim having a width of 29 inches and a flange height of 6 inches is used, and an air pressure of the tire is 686 kPa, and a load is 588 kN.

TABLE 1

| | Unit | Example tire 1 | Example tire 2 | Conventional tire 1 | Conventional tire 2 | Example tire 3 | Example tire 4 | Example tire 5 |
|---|---|---|---|---|---|---|---|---|
| Thickness of tread at equatorial plane of tire | mm | 110 | 110 | 110 | 110 | 110 | 110 | 110 |
| Thickness of tread at ground contact end | mm | 140 | 140 | 140 | 140 | 140 | 140 | 140 |
| JIS A hardness at central zone of tread | ° | 63 | 63 | 63 | 63 | 63 | 63 | 63 |
| Tan δ (25° C.) at central zone of tread | — | 0.16 | 0.16 | 0.16 | 0.16 | 0.16 | 0.16 | 0.16 |

TABLE 1-continued

|  | Unit | Example tire 1 | Example tire 2 | Conventional tire 1 | Conventional tire 2 | Example tire 3 | Example tire 4 | Example tire 5 |
|---|---|---|---|---|---|---|---|---|
| Average groove width of widthwise groove | mm | 70 | 70 | 70 | 70 | 70 | 70 | 70 |
| Average groove depth of widthwise groove | mm | 95 | 95 | 95 | 95 | 95 | 95 | 95 |
| Average groove width of circumferential fine groove/ average groove width of widthwise groove | — | 0.25 | 0.45 | 0.45 | — | 0.25 | 0.25 | 0.25 |
| Average groove depth of circumferential fine groove/ average groove depth of widthwise groove | — | 0.95 | 0.85 | 0.95 | — | 0.95 | 0.95 | 0.95 |
| Average groove width of widthwise fine groove/ average groove width of widthwise groove | — | 0.25 | 0.25 | 0.85 | — | 0.25 | 0.25 | 0.25 |
| Average groove depth of widthwise fine groove/ average groove depth of widthwise groove | — | 0.95 | 0.85 | 0.95 | — | 0.95 | 0.95 | 0.95 |
| Average intersecting angle of widthwise fine groove with respect to equatorial line of tire | ° | 70 | 70 | 70 | — | 70 | 70 | 70 |
| Behavior of circumferential fine groove in ground contact | — | closed | not closed | not closed | — | closed | closed | closed |
| Behavior of widthwise fine groove in ground contact | — | closed | closed | not closed | — | closed | closed | closed |
| Height of raised bottom portion at side edge of tread | mm | — | — | — | — | 20 | 20 | 20 |
| in circumferential fine groove at tread center | mm | — | — | — | — | — | 20 | 20 |
| Decrease of height in corner part | — | — | — | — | — | absence | absence | presence |

With respect to the wear resistance, each of the tires is mounted onto a front wheel of a construction vehicle and run at an approximately equal speed of 10 km/h for 1000 hours, and thereafter the tread is divided into 8 parts in the widthwise direction of the tire and remaining groove degrees at these 8 positions are measured to calculate an average value Gw of rubber gauge of the tread worn through the running. A value obtained by dividing the running time by the average value Gw is evaluated as a value of wear resistance and represented by an index on the basis that the conventional tire 2 is control.

With respect to the resistance to crack growth, each of the test tires is mounted onto a driving shaft of a rear wheel of a construction vehicle and run on an off road at an approximately equal speed of 10 km/h for 1000 hours after cut failure reaching to the belt is formed in the central zone of the tread to measure a length of crack growth. A value obtained by dividing the running time by the crack growth length is evaluated as a vale of resistance to crack growth and represented by an index on the basis that the conventional tire 2 is control.

With respect to the heat radiation, a hole of about 10 mm in diameter reaching to the belt layer is previously formed at a central position of a block located at each of 8 positions of the tread in the widthwise direction of the tire, and then the tire is run on a drum of 5 m in diameter at a speed of 10 km/h for 48 hours, and thereafter a temperature of each hole is measured through a thermocouple. The heat radiation is evaluated by a highest temperature among the measured values.

Moreover, an atmosphere temperature is about 30° C., and the evaluation is carried out according to a standard that the temperature of the conventional tire 2 is 0.

With respect to the traction performance, each of the test tires is mounted onto a driving shaft of a rear wheel of a construction vehicle and run on an off road at an equal speed of 10 km/h from a flat state to a slope having an inclination degree of 8%, during which the traction performance is evaluated by 5 stages according to a standard that the conventional tire 2 is 4.

The evaluation results on each performance are shown in Table 2. Moreover, the larger the absolute value of each numeral, the better the result.

TABLE 2

|  | Example tire 1 | Example tire 2 | Conventional tire 1 | Conventional tire 2 | Example tire 3 | Example tire 4 | Example tire 5 |
|---|---|---|---|---|---|---|---|
| Wear resistance | 160 | 135 | 100 | 100 | 165 | 168 | 170 |
| Resistance to crack growth | 140 | 140 | 130 | 100 | 140 | 140 | 140 |
| Heat radiation | −1 | −2 | −4 | 0 | −1 | −1 | −1 |
| Traction performance | 5 | 5 | 5 | 4 | 5 | 5 | 5 |

As seen from Table 2, the wear resistance and the resistance to crack growth are considerably excellent in each of the example tires ass compared with each of the conventional tires.

As to the heat radiation, each of the example tires is poor as compared with the conventional tire 1, but shows an excellent result as compared with the conventional tire 2. This is considered due to the fact that since each of the example tires is large in the block volume as compared with the conventional tire 1, the quantity of heat generation increases but the decrease of the groove volume is not so large and hence the heat radiation is relatively good and the control of the temperature rise is advantageously realized.

As to the traction performance, each of the example tires shows a result equal to those of the conventional tires.

EXAMPLE 2

A mold cost and an exchanging time of a split mold part are determined by changing a kind of molds and a boundary position between mold parts, while an uneven wear of a land portion in a product tire due to the presence of spew rubbers produced at the boundary position between the mold parts is measured at a time of running the tire at a speed of 10 km/h over 5000 km to obtain results as shown in Table 3.

In this case, the tire size, use conditions and the like are the same as in Example 1.

TABLE 3

|  | Conventional Example | Comparative Example 1 | Example 1 | Example 2 | Example 3 | Example 4 | Example 5 | Example 6 | Comparative Example 2 |
|---|---|---|---|---|---|---|---|---|---|
| Kind of mold | full mold | full mold | split mold | split mold | full mold + split mold | full mold + split mold | full mold + split mold | full mold + split mold | full mold + split mold |
| Figure corresponding to pattern | FIG. 9 (lug) | FIG. 1 | FIG. 1 | FIG. 1 | FIG. 3a | FIG. 3b | FIG. 3c | FIG. 3d | FIG. 1 |
| Boundary position | none | none | in center block | in shoulder block | widthwise outer edge of groove | widthwise outer edge of groove | straight at outer end portion of groove | in land portion of shoulder | in center block |
| Mold cost *1 | 100 | 100 | 250 | 250 | 190 | 170 | 175 | 175 | 175 |
| Exchanging time of split mold part *2 | — | — | 100 | 100 | 85 | 85 | 85 | 85 | 85 |
| Take-out of vulcanized tire | possible | impossible | possible | possible | possible | possible | possible | possible | impossible |
| Uneven wear *3 (influenced by spew) | 94 | impossible to produce tire | 94 | 94 | 100 | 100 | 97 | 94 | impossible to produce tire |

*1: The smaller the value, the better the cost.
*2: In case of changing pattern by exchanging only split mold part, the smaller the value, the better the time.
*3: Uneven wear: ratio of worn amounts in land portions at boundary position (excluding cut portion and the like) (worn amount of minimum worn portion/worn amount of maximum worn portion) of 100 is good, while small value thereof is bad.

As seen from Table 3, the exchanging of the split mold part is excellent in all examples though there is a disadvantage in the mold cost, and also the smooth taking-out of the vulcanized tire can be attained. Particularly, the uneven wear due to the presence of spew rubbers can be effectively prevented in Examples 1, 2 and 6.

INDUSTRIAL APPLICABILITY

According to the invention, the wear resistance and the resistance to crack growth in the off-the-road tire can be improved while ensuring the excellent heat radiation.

The invention claimed is:

1. An off-the-road tire having a gauge of a tread rubber within a range of 60-200 mm, in which a plurality of widthwise grooves extending substantially in a widthwise direction of the tire are arranged in each side region of the tread, and a pair of circumferential fine grooves continuously extending zigzag in a circumferential direction of the tire are arranged in a central zone of the tread, and a groove bottom of only an end portion of a straightforward extending portion in the zigzag circumferential fine groove is rendered into a raised bottom at an end portion located toward a side edge of the tread and/or an end portion located toward the side of the tread center, and a plurality of widthwise fine grooves extending substantially in the widthwise direction of the tire and contacting their groove walls with each other in a ground contact area are arranged between these circumferential fine grooves, and wherein the groove width of the circumferential fine groove is rendered into a width contacting the groove walls with each other in a ground contact face.

2. An off-the-road tire according to claim 1, wherein the widthwise groove has a groove width of 25-80 mm.

3. An off the-road tire according to claim 1, wherein the widthwise groove has a groove depth of 50-160 mm.

4. An off-the-road tire according to claim 1, wherein a groove dept of the circumferential fine groove is 60-100% of the groove depth of the widthwise groove.

5. An off-the-road tire according to claim 1, wherein the groove width of the widthwise fine groove is 15-50% of the groove width of the widthwise groove.

6. An off-the-road tire according to claim 1, wherein the groove depth of the widthwise fine groove is 60-100% of the groove depth of the widthwise groove.

7. An off-the-road tire according to claim 1, wherein an average intersecting angle of the widthwise fine groove at an acute angle side with respect to the equatorial line of the tire is 45-90°.

8. An off-the-road tire according to claim 1, wherein a tread rubber in the central zone of the tread has a JIS A hardness of 55-80 and a loss tangent tan δ (25° C.) of 0.05-0.35.

9. An off-the-road tire according to claim 1, wherein each of blocks defined by the circumferential fine grooves and the widthwise fine grooves as a land portion is triangular, quadrilateral or hexagonal.

10. An off-the-road tire according to claim 1, wherein a surface height of a corner part in the land portion adjacent to the side edge of the tread defined by the zigzag extending circumferential fine grooves is gradually decreased toward the zigzag circumferential fine grooves.

11. An off-the-road tire according to claim 1, wherein a groove width of the circumferential fine groove is 15-50% of the groove width of the widthwise groove.

12. A method of producing an off-the-road tire having a gauge of a tread rubber within a range of 60-200 mm, in which a plurality of widthwise grooves extending substantially in a widthwise direction of the tire are arranged in each side region of the tread, and a pair of circumferential fine grooves continuously extending zigzag in a circumferential direction of the tire are arranged in a central zone of the tread, and a groove bottom of only an end portion of a straightforward extending portion in the zigzag circumferential fine groove is rendered into a raised bottom at an end portion located toward a side edge of the tread and/or an end portion located toward the side of the tread center, and a plurality of widthwise fine grooves extending substantially in the widthwise direction of the tire and contacting their grooves walls with each other in a ground contact area are arranged between these circumferential fine grooves, comprising:

vulcanizing a product tire to produce said off-the-road tire through a mold in which a width of a projection for the formation of the circumferential fine groove is made smaller than a width of a projection for the formation of the widthwise fine groove.

13. A method of producing an off-the-road tire according to claim 12, wherein a region corresponding to a bead portion and a sidewall portion and a tread shoulder portion of a product tire is vulcanized to produce said off the-road tire through a mold part of a full mold form and a region corresponding to a central portion of a tread located from the tread shoulder portion toward a tread center is vulcanized through a mold part of a split mold form, respectively.

14. A method according to 13, wherein a boundary between the mold part of the full mold form and the mold part of the split mold form is made in correspondence with a groove edge of a zigzag circumferential fine groove to be formed in the tread and located toward a side edge of the tread, and the vulcanization is conducted in a mold of these mold parts located along the groove edge.

15. A method according to 13, wherein the vulcanization is carried out though a mold in which a boundary between the mold part of the full mold form and the mold part of the split mold form is straightforward positioned in correspondence with a groove edge of a zigzag circumferential fine groove to be formed in the tread and located nearest to a side edge of the tread.

16. A method according to 13, wherein the vulcanization is carried out through a mold in which a boundary between the mold part of the full mold form and the mold part of the split mold form is positioned in correspondence with a land portion defined by the circumferential fine groove to be formed in the tread toward the side edge of the tread.

* * * * *